Nov. 18, 1924. 1,515,815
C. R. ROCHE
AUTOMOBILE
Filed Nov. 10, 1921 11 Sheets-Sheet 1

Nov. 18, 1924.

C. R. ROCHE 1,515,815

AUTOMOBILE

Filed Nov. 10, 1921     11 Sheets-Sheet 4

Inventor
C. R. Roche
By Daniel J. Brennan
Attorney

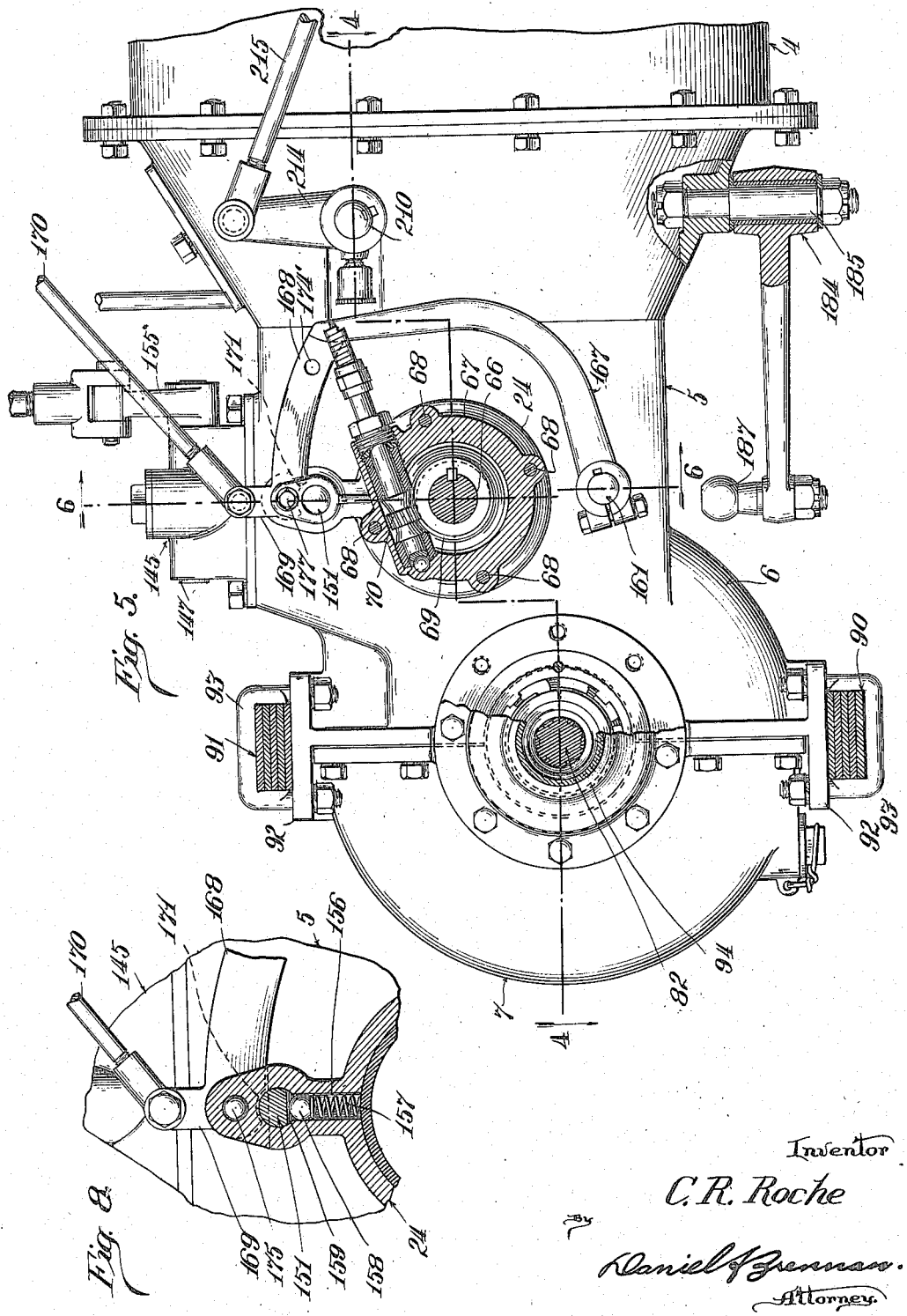

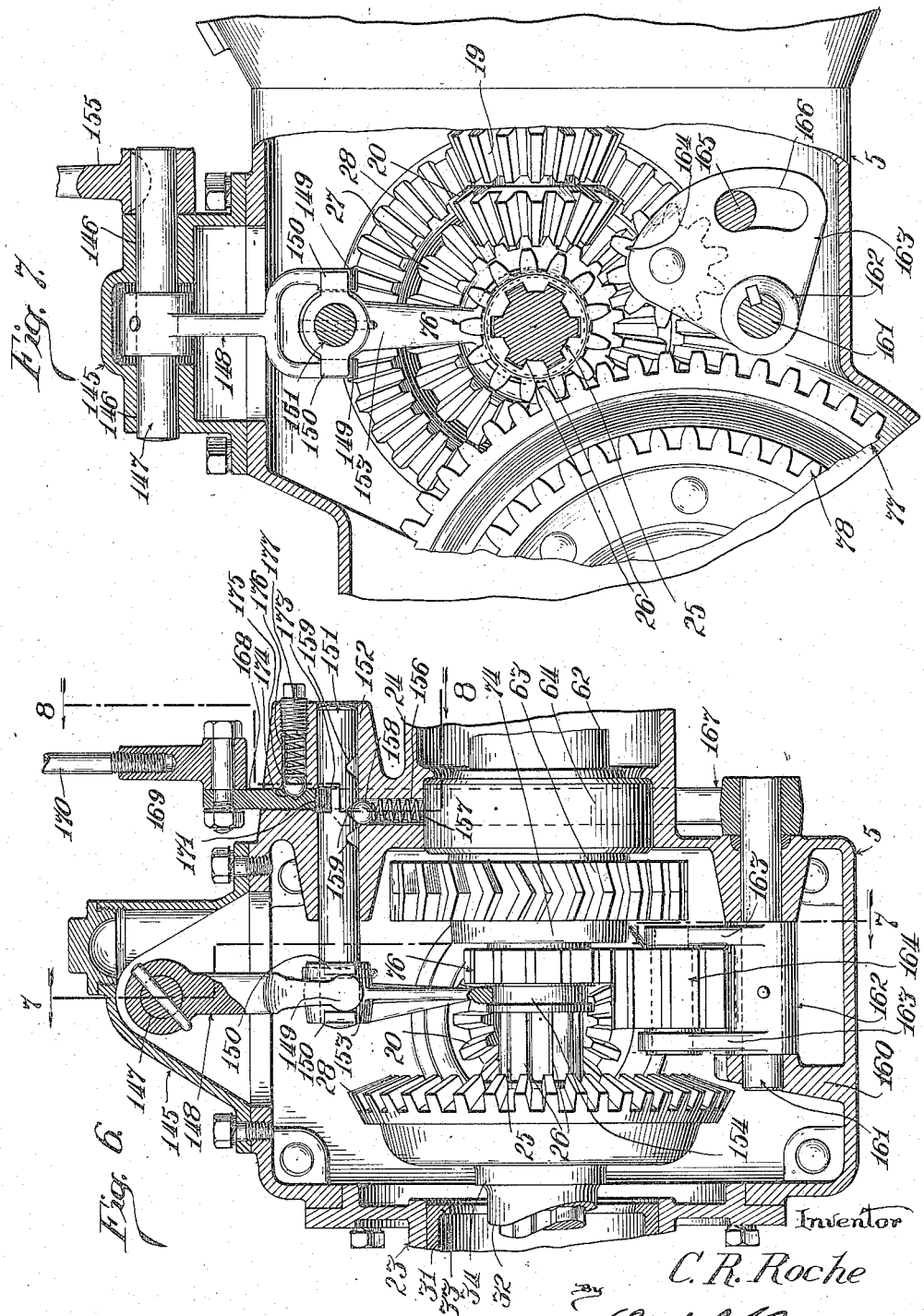

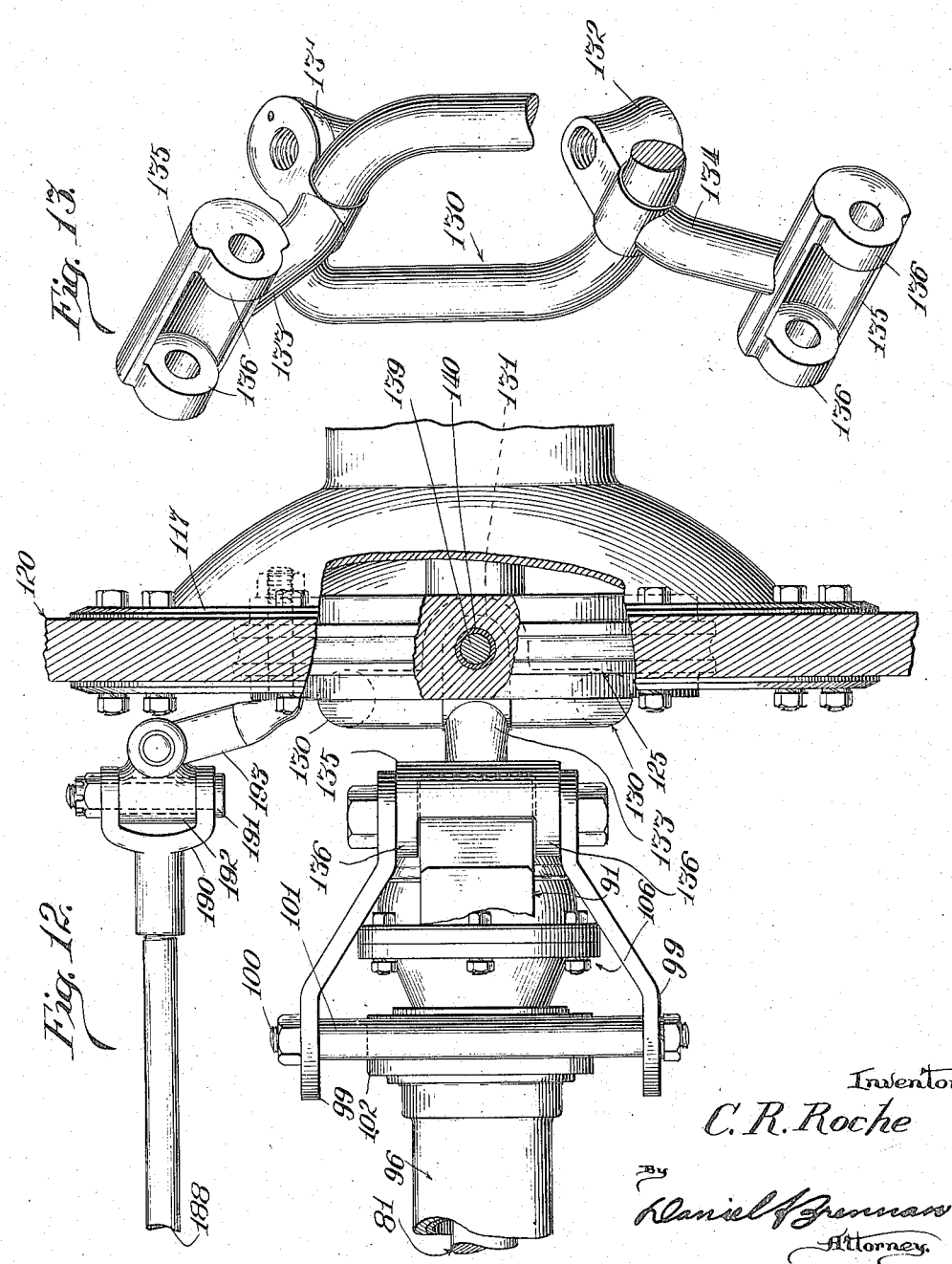

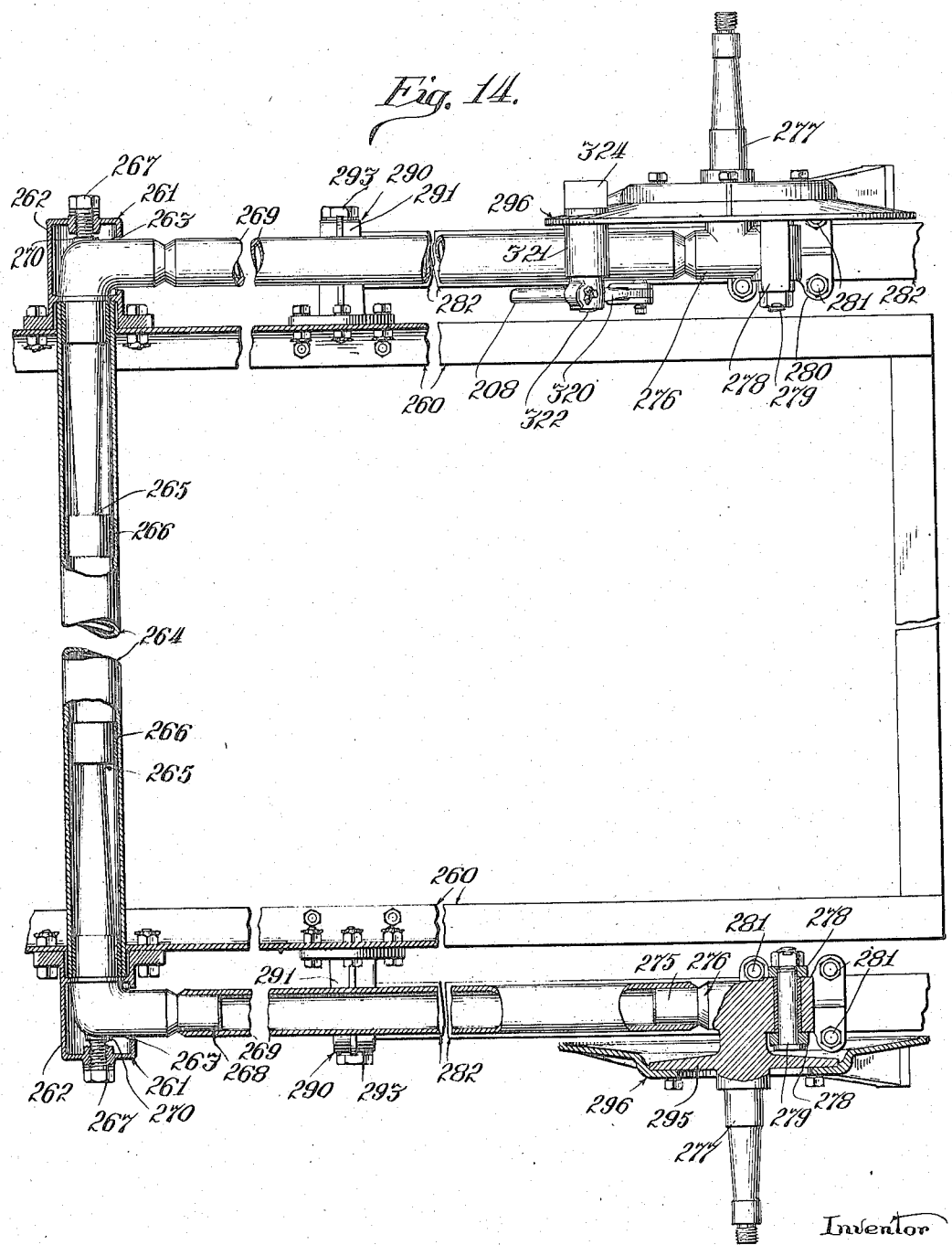

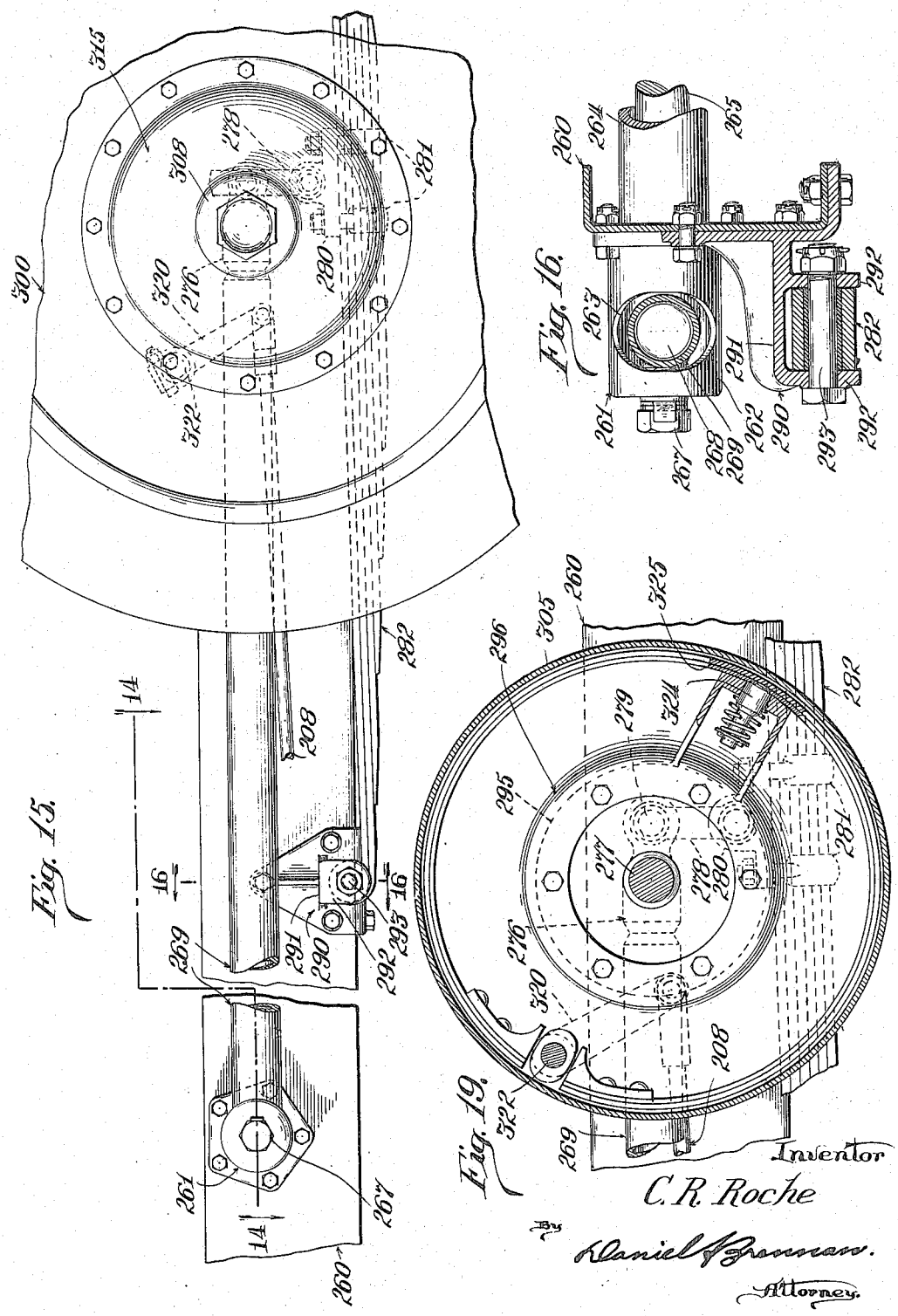

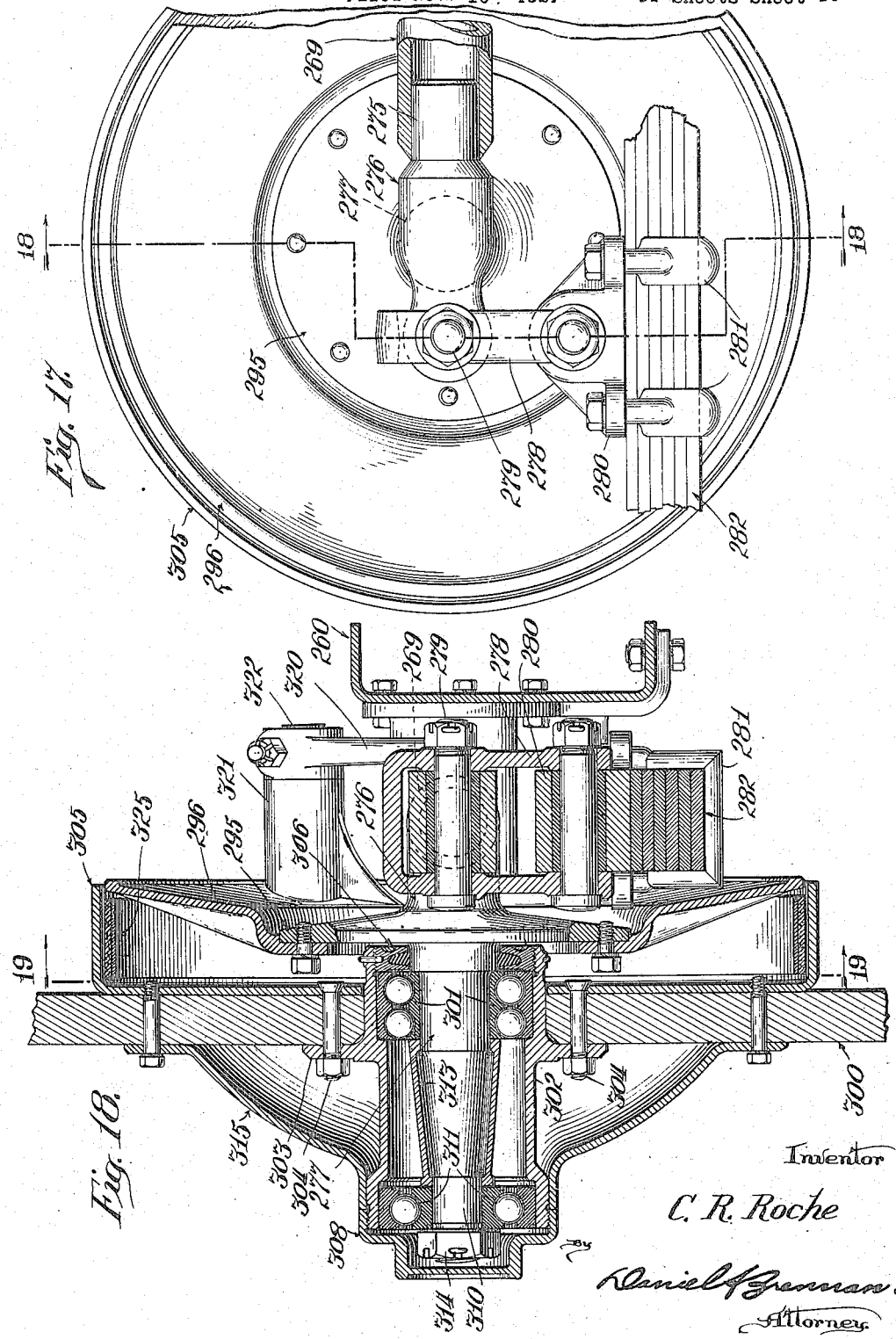

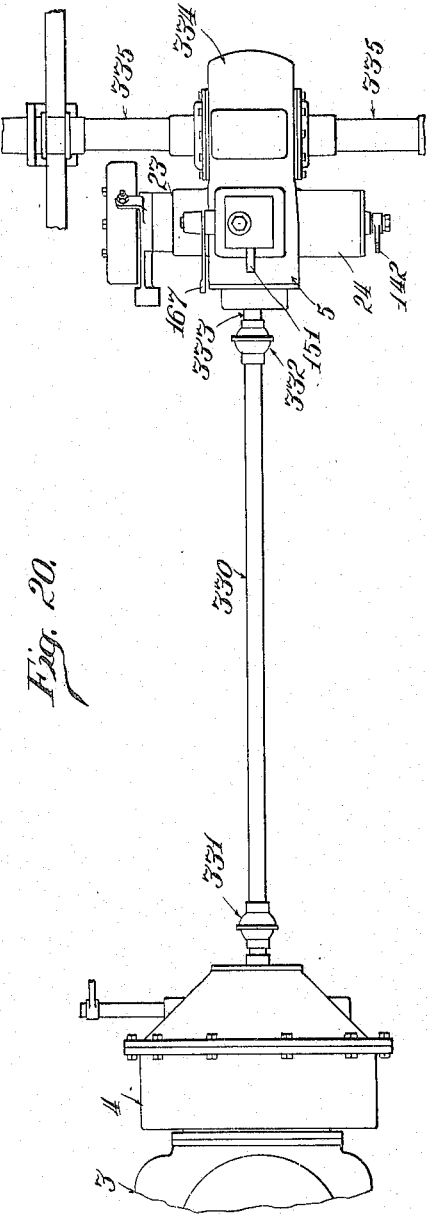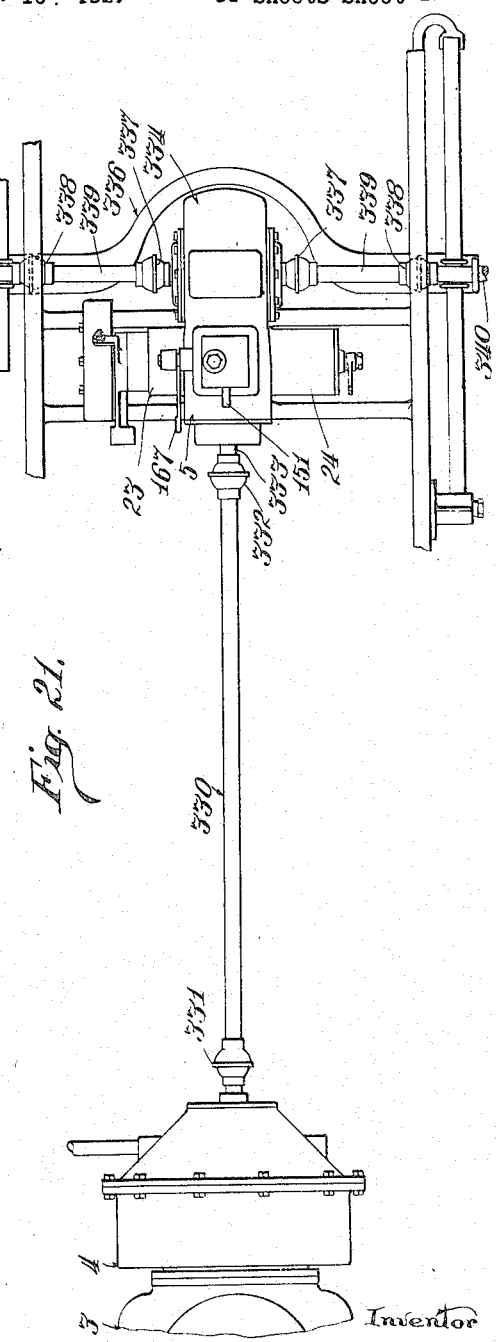

Patented Nov. 18, 1924.

1,515,815

UNITED STATES PATENT OFFICE.

CLIFTON R. ROCHE, OF CHICAGO, ILLINOIS.

AUTOMOBILE.

Application filed November 10, 1921. Serial No. 514,248.

*To all whom it may concern:*

Be it known that I, CLIFTON R. ROCHE, a citizen of the United States, residing at Los Angeles, State of California, have invented a new and useful Improvement in Automobiles, of which the following is a specification.

This invention relates to improvements in automobiles and it applies particularly to the transmission mechanism and gear shift mechanism, as well as to the support of the wheels and steering means for the wheels.

It is an object of the invention to provide a drive gear which acts upon the front wheels instead of forcibly rotating the rear wheels as in most of the known constructions. By accomplishing this object, the invention finds its embodiment in a drive which reduces the tendency to skid when the vehicle is in motion. In automobiles in which the power is applied to the rear wheels, the latter have a tendency to push the car ahead when a turn is made and owing to this angular direction of the force applied to the car with respect to the direction in which the car is caused to travel, the skidding movement is produced which frequently leads to accidents and at any rate constitutes one of the causes of excessive wear on tires.

It is also an object of the invention to provide a front wheel drive for automobiles in order to apply the power directly to those wheels which in the travel of the vehicle encounter obstructions in the roadway. If a rear wheel drive automobile encounters these obstructions the force applied to the rear wheels will push the front wheels against the obstructions while in a front wheel drive, owing to the application of the power to the front wheels, the latter will have a tendency to ride over the obstruction. In traveling on very soft road-beds it is also more advisable to apply a pulling power to a vehicle than a pushing force, as owing to the pulling force applied to the front wheels the passage of the automobile through this soft material is facilitated.

The object of the invention also is to provide a better distribution of weight on the four wheels of the vehicle, as in the ordinary wheel drive. In the usual rear-wheel drive the torque reaction which mainly acts on the rear axle is added to the weight which is also largely supported by the rear axle. In the front wheel drive the front portion is heavier than the rear portion of the automobile while the torque reaction still exerts its main influence upon the rear axle. In the front wheel drive, therefore, a better distribution of the weight and tractive forces is attained and consequently the wear and tear on the tires is less than in the known automobiles.

The invention also contemplates the provision of a gear drive and gear shift mechanism which is greatly simplified as compared with the known mechanisms serving the same function. It also contemplates to support the gear shift mechanism as well as the differential gearing independently of the axles of the vehicle on the chassis or frame of the same, eliminating thereby the necessity of building heavy axles and decreasing largely those dangers to which differential mechanisms are exposed when mounted on the rear axle. The shocks to which axles are subjected in the travel of the vehicle are in this way not transmitted from the axles to the differential gearing and the danger of breakage of the parts of the same is greatly decreased.

The invention also contemplates the provision of an improved support of the differential with respect to the chassis; and as the differential, as well as the gear shift mechanism, is supported by means of springs, the proportion of the spring supported weight to the entire weight of the car is greatly increased over the known constructions.

An object of the invention is, furthermore, to provide an automobile in which not only the engine but also the gear shift mechanism and differential gearing are readily accessible upon removal of the hood and upon removal of casing portions disposed below said hood. Owing to this arrangement of the parts, the latter may easily be reached so as to permit of repairs or exchanges without compelling the repair man to work from below the car.

It is, furthermore, an object of the invention to provide an automobile of this character in which the number of actuating levers or handle bars extending through the footboard near the driver's seat is greatly reduced, and wherein those ends of the actuating bars or rods which must be operated to shift gears or to reverse the drive, are better accessible to the driver than in the cars known at the present time.

An object of the invention also is to provide an automobile in which, contrary to the known constructions, the main weight of the entire automobile is not placed closely to the longitudinal center of the car but is rather disposed near one end of the same. By concentrating the weight near the center of the car the vibrations produced during the travel will be vibrations of short periods and owing to their great frequency they will have a more disturbing effect on the passengers than the vibrations which recur in less frequent periods. While in the known cars it has become necessary to lengthen the wheel base in order to decrease the frequency of vibrations, increasing thereby the amplitudes of the same, in the present construction the reduction in frequency is attained without an undue increase of the wheel base.

The invention also has the object of mounting a power aggregate for an automobile which includes the prime mover, its fly wheel and clutch, the gear shifting mechanism and differential, on the frame of the car directly without being supported entirely or partly on the axles of the vehicle.

Another object of the invention is to provide a casing which, while composed of several parts, has a plurality of intercommunicating chambers in which the various mechanisms are located. Owing to this fact, the necessity of providing separate mechanisms for forcing a lubricant into the various compartments or chambers, is eliminated as the chambers are in direct communication with each other.

Another object of the invention is to provide a gear shift mechanism in which through subdivision of the selecting means a larger number of driving ratios to be selected, is made possible so that for instance for forward drive four different speeds are attainable while two different speeds may be selected for reverse drive.

Another object of the invention is to establish a driving connection between the differential and the wheels through shafts which are composed of parts in universal connection with each other, whereby even upon alteration of the angular relation of these parts, the positive drive to the wheels is permanently maintained at the desired rate of speed, and whereby, furthermore, owing to the subdivision of the shafts into several angularly adjustable parts, the steering of the vehicle can be effected easier and on a shorter radius than in the known constructions.

It is also an object of the invention to provide in connection with a drive of this character a novel construction of a support for rear wheels, the axles of the rear wheels being mounted independently of the frame of the vehicle, so as to permit each of the rear wheels an independent movement about an axis which does not coincide with the axis of the wheel, which support, however, at the same time prevents excessive movement and provides a yielding connection between the wheels and the frame.

With these and numerous other objects in view, an embodiment of the invention is described in the following specification in which reference is made to the accompanying drawings.

In the drawings:

Fig. 5 is an elevation and partly section of the casing elements, which enclose the drive and transmission gearing;

Fig. 6 is a vertical sectional view on line 6—6 of Fig. 5 to show the differential gear and gear shift mechanism;

Fig. 7 is an elevation and partly a sectional view taken on line 7—7, Fig. 6;

Fig. 8 is a detail sectional view on line 8—8 of Fig. 6;

Figs. 9, 10 and 11 are diagrammatic illustrations of the relative positions of several cam elements which form a part of the gear shift mechanism;

Fig. 12 is a sectional view on line 12—12 of Fig. 3, to illustrate a steering device for the front wheels;

Fig. 13 is a perspective view of a yoke connected with the front wheel to effect the steering of the same;

Fig. 14 is a top plan view and partly section on line 14—14 of Fig. 15, of an improved means for supporting the rear wheels in an automobile of this character;

Fig. 15 is a side elevation of a support illustrated in Fig. 14, but shown on a larger scale;

Fig. 16 is a detail sectional view on line 16—16 of Fig. 15;

Fig. 17 is a view and partly section of a wheel support seen from the inner side;

Fig. 18 is a central sectional view through the same on line 18—18 of Fig. 17;

Fig. 19 is a sectional view through a brake drum of a rear wheel, on line 19—19 of Fig. 18;

Fig. 20 is a top plan view of a modification of the device illustrating the connection of the gear shift mechanism with the rear axle; and Fig. 21 is a view similar to Fig. 20, showing a modified construction of the rear axle drive.

Figure 1:
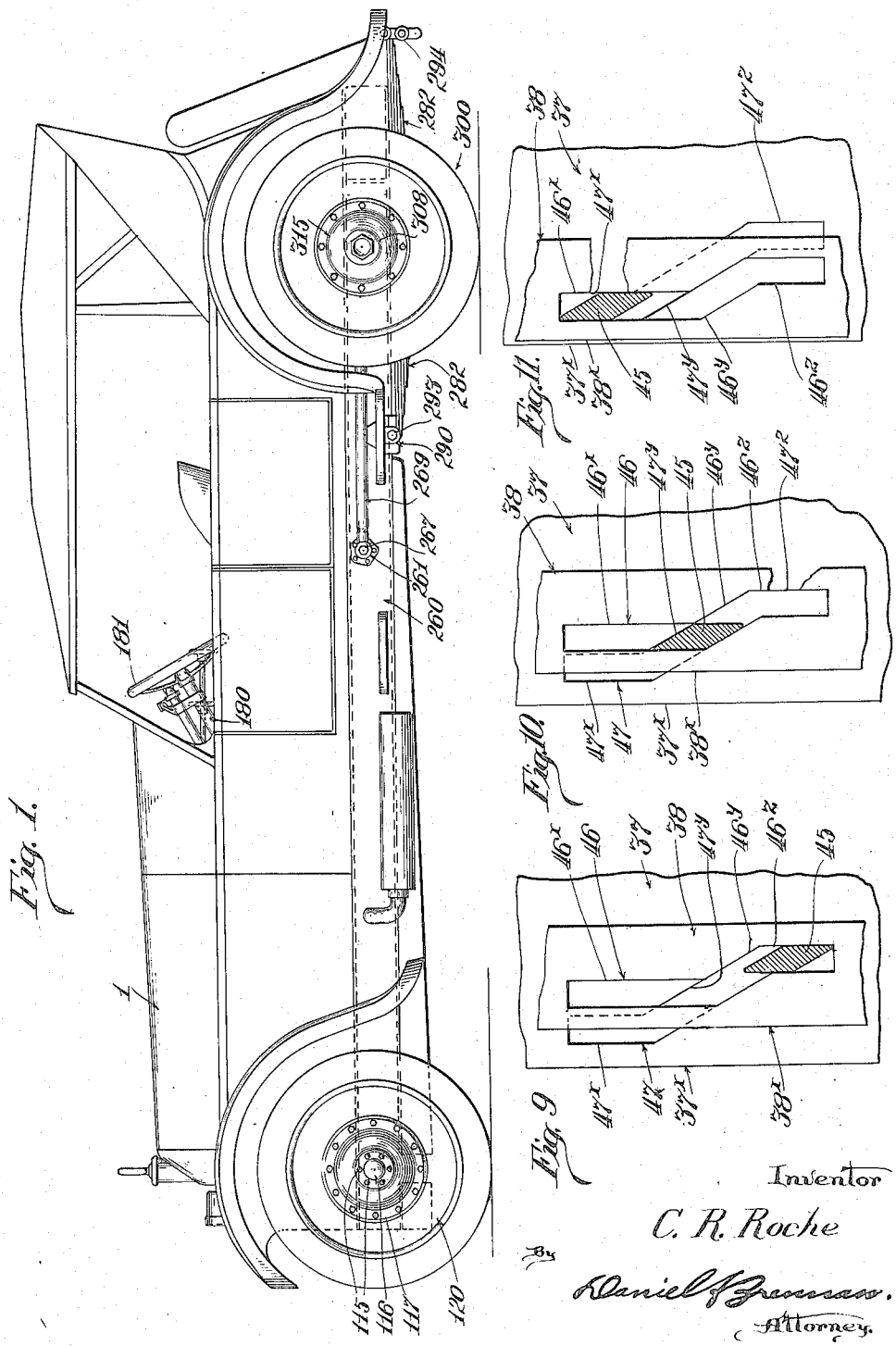
Fig. 1 is a side elevation of a complete automobile embodying the invention.
Figure 2:
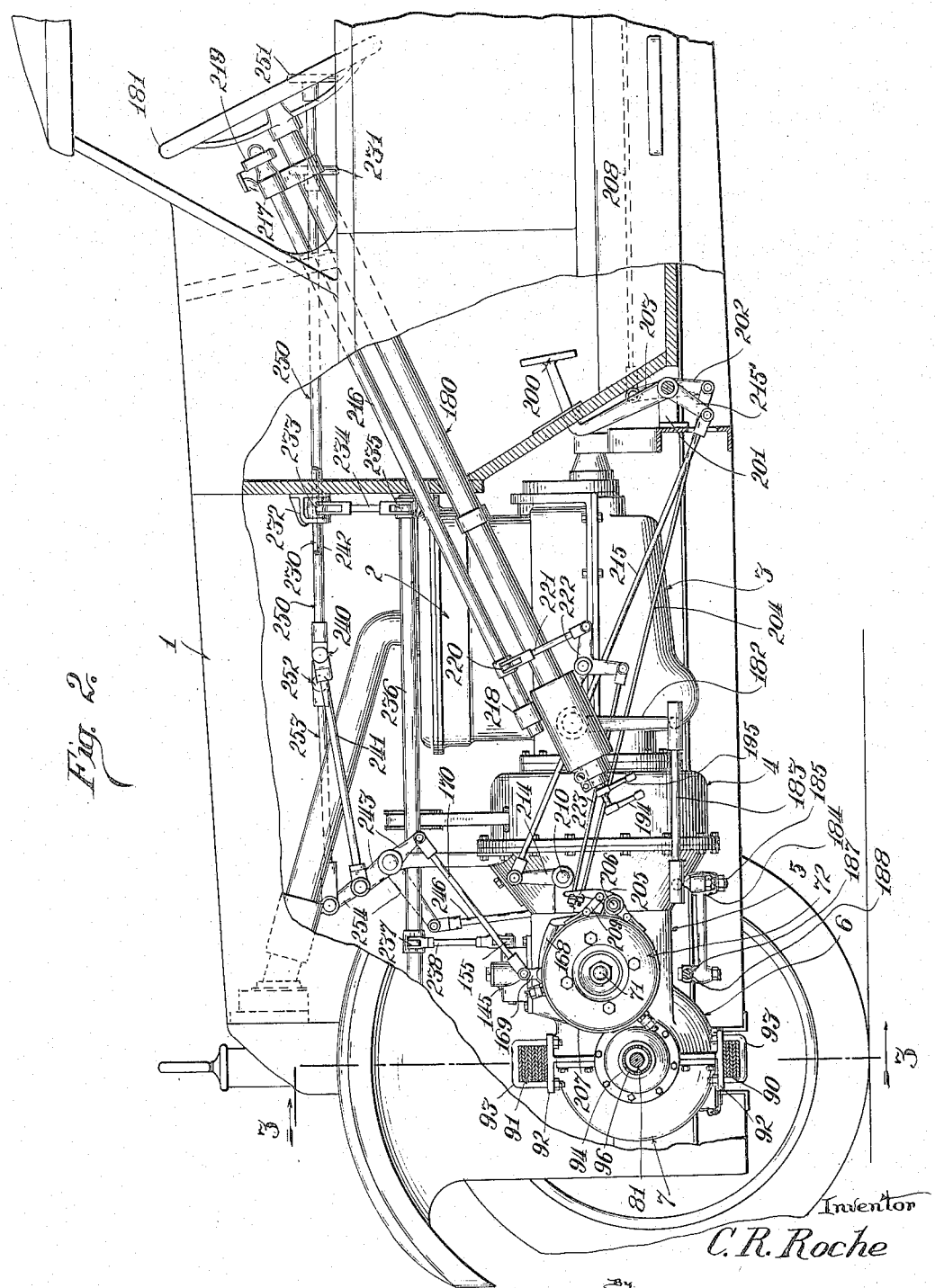
Fig. 2 is a side elevation and partly section of the assembled motor, transmission gearing and drive, with the controlling means for the same.

With reference to Figs. 1 and 2, it will be seen that in the present invention the motor of the vehicle together with the transmission mechanism for driving certain wheels of the vehicle, is mounted under the hood 1 of the car which may have otherwise the ordinary construction. The prime mover 2 in the form of a suitable combustion engine or other engine, is bolted to a crank casing 3 which is connected with a casing portion 4 to receive the fly wheel (not shown), the fly wheel in the present embodiment of the invention being mounted directly on the crank shaft and in front of the engine. A flange at the edge of the fly wheel casing 4 serves for the attachment of another casing 5 of suitable shape in which the change speed gear and gear shift mechanism is located, and which in its turn is shown integral with a portion 6 of the differential gear casing; the differential casing is completed by the housing portion 7.

The entire power aggregate, including the prime mover, change speed gear, differential and the shaft to be driven by the same, is therefore disposed at the front of the vehicle, and is covered by the hood whereby upon the opening of the hood all of the casings for the prime mover, fly wheel, gear shift mechanism and differential become accessible, and the opening of these casings may be greatly facilitated.

The engine shaft on which the fly wheel (not shown) is mounted, may be suitably supported, and its projecting end may be constructed to receive the shaft 10 and to drive the same. The shaft 10 is rotatably mounted at the other end in a bearing 11, the friction reducing elements of which, for instance in the form of balls, are held against axial displacement in a flanged cylindrical sleeve 12, Fig. 4. This sleeve has an outer thread by which it is seated in a suitable opening of the casing 5, and is, at the projecting end, provided with teeth 13 to facilitate the positioning of the same. Near the front end this bearing retainer 12 is provided with an internal thread adapted to receive a cap 14 which closely surrounds the shaft 10 (the latter being designated motor shaft) having packings placed in suitable grooves.

The front end of the shaft 10 is constructed as a bevel gear 19 which is provided with a cylindrical central bore to receive the hub of a second concentric bevel gear 20, the two bevel gears being rigidly connected to each other by means of a key whereby upon rotation of the shaft 10 both of these bevel gears are continuously rotated. Security against axial displacement of the bevel gear 20 is attained by means of a spindle 22 which passes centrally through the hub of the bevel gear 20 into the shaft 10, and which is held against rotation therein and also against axial displacement owing to the provision of a nut at a projecting end of the spindle.

Figure 4:
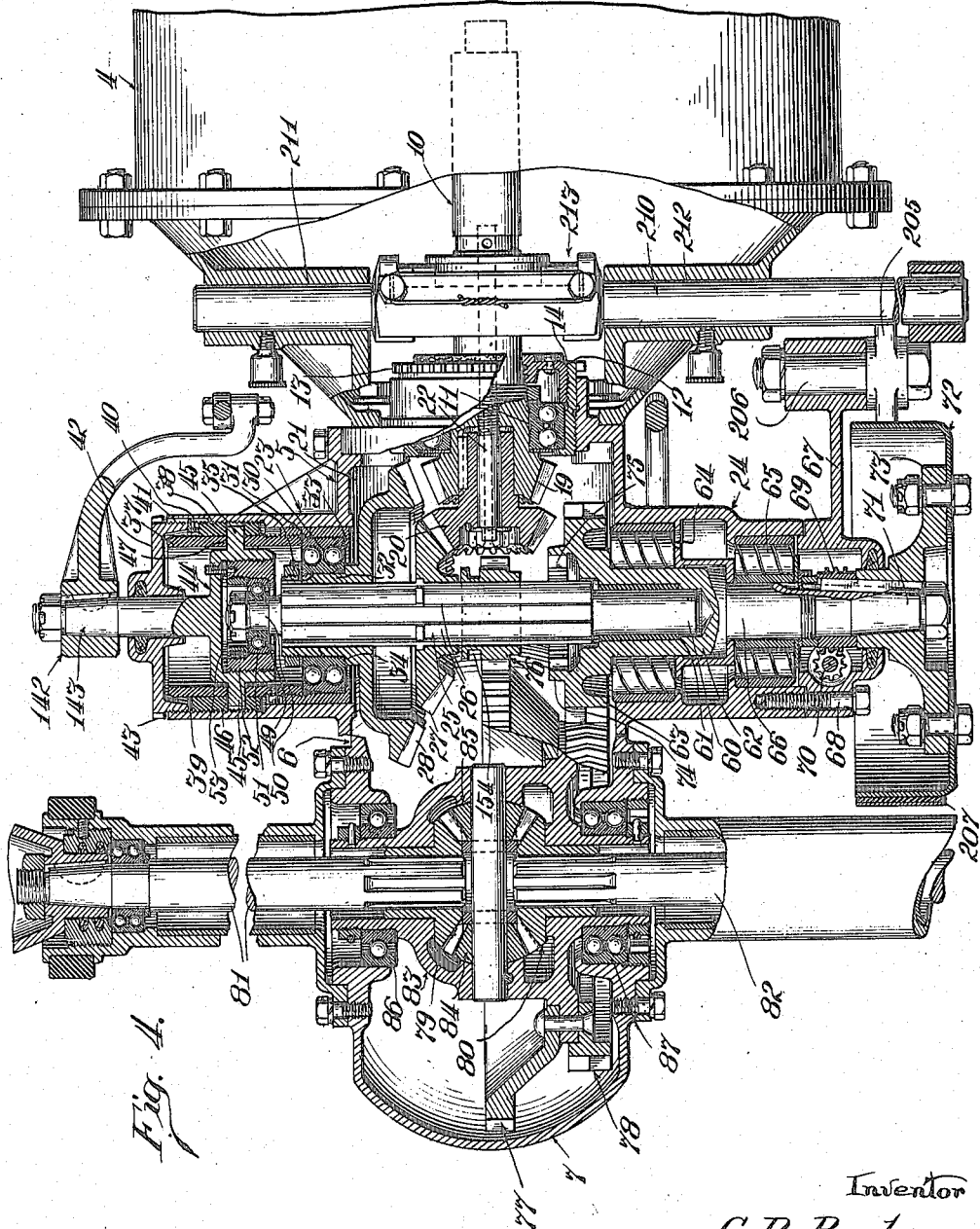
Fig. 4 is a horizontal, sectional view through the transmission and differential drive, taken on line 4—4 of Fig. 5.

The casing 5 for the gear shifting mechanism comprises a large central chamber 21, as shown in Fig. 4, and two lateral extensions 23 and 24. A countershaft 25 is rotatably mounted within the casing 5 and is provided with a plurality of longitudinal keyways or splines 26. This countershaft serves for supporting two bevel gears 27 and 28. The bevel gear 27 which is shown in mesh with the bevel gear 20, is held against axial displacement on the shaft 25, while the bevel gear 28 may be axially shifted thereon. Two different rates of speed of the countershaft 25 may be obtained through selectively bringing the bevel gears 27 and 28 into engagement with the bevel gears 20 and 19, respectively.

The support of the countershaft 25 within the casing chamber 23 is effected partly by a bearing 30 having friction reducing elements as balls interposed between a sleeve 31, and a hub extension 32 of the bevel gear 25. The sleeve 31 is in frictional sliding engagement with the inner cylindrical surface of the casing chamber 23. This sleeve has at its inner end an inwardly directed flange 33, whereby through the displacement of this sleeve axially in a direction away from the bevel gear 28, the bearing 30 also may be displaced in the same direction. The hub 32 of the bevel gear is provided with a shoulder 34 against which the end surfaces of ball bearing 30 abut and a collar 35 is secured to the end of the hub extension.

The sleeve 31 is provided with an internal thread at that end which is opposite to the flange 33. Into this threaded end of the sleeve another sleeve 37 enters, whereby, upon axial displacement of the sleeve 37 in either direction, the sleeve 31 also is axially displaced. While, however, the sleeve 31 is slidable on the inner surface of the chamber 23 of the casing, the sleeve extension 37 is in frictional contact with a cylinder 38, which ring is held against any axial displacement in the chamber 23 by means of threads engaging internally threaded portions of the casing chamber 23.

A fixed position of the sleeve 38 within the chamber is permanently assured by a ring 39 having a tongue 40 projecting into a suitable recess at one end of the sleeve 38, this ring also having a projection which enters a key-way 41 near the outer end of the chamber 23. The end of the chamber is closed by a cap 42, the application or removal of which may be facilitated by the provision of teeth 43 on its outer edge for the use of a spanner wrench.

A cup shaped element or cylinder 44 is disposed within the chamber 23 and has projections 45 at diametrically opposite points. These projections are diamond shaped in cross section and extend through suitable cam slots 46 and 47 of the sleeves 38 and 37, respectively. Figs. 9, 10 and 11 illustrate diagrammatically the relative positions of these two cam sleeves, and in these diagrams the projections 45 of the cam cylinder 44 are indicated in section lines.

To facilitate orientation in these diagrams the rear edges of the sleeves are indicated at $37^x$, $38^x$, and the cam slot portions at $46^x$, $46^y$, $46^z$, and $47^x$, $47^y$, and $47^z$, respectively. When the cam lugs 45 are in the position of Fig. 9, the pinions 27 and 20 are in engagement, as illustrated in Fig. 4.

The slot portions $46^x$ and $47^x$ are in register, and the cams 45 pass through these portions and hold them there. In order to change the speed of the countershaft 25 with respect to that of the shaft 10, it is necessary first to interrupt this engagement between the bevel gears 27, 20 and then to throw the gears 28 and 19 into engagement with each other.

Upon moving the cams 45 through rotation of the cup 44, from the slot portions $46^x$, $47^x$, to the cam slot portions $46^y$, $47^y$ (Fig. 10) no movement in axial direction of the two sleeves 37, 38 is produced. The distance between the edges $37^x$, $38^x$ remained unaltered. The cams 45, however, have been shifted in axial direction. As the cup 44 in this axial movement also axially displaces the shaft 25, the gear 27 fixed to this shaft will be disengaged from the bevel gear 20. Fig. 10, therefore, illustrates the neutral position of the gear shift mechanism.

The cams 45 abut now against a side of the slot $46^z$ in the fixed cylinder 38, and a further axial displacement of the cam 45 cannot take place. In the continued rotary movement of the cup 44 the cams 45 bring the slot portions $46^z$, $47^z$ into register (Fig 11) with the effect that the distance between the edges $37^x$, $38^x$ is decreased considerably, and as sleeve 38 is fixed this means that sleeve 37 is pushed in a considerable distance, and taking the bearings 30 and hub extension 32 of bevel gear 28 along in this movement, the last named bevel gear will be thrown into engagement with bevel gear 19, to produce a reduction of the speed of the countershaft 25 with respect of shaft 10. Through the successive movement of these cam elements 37, 45 in circumferential and axial direction, the various changes of speed are, therefore, produced.

It is obvious that corresponding inverse changes of speed will be produced upon movement of the cams 45 in inverse direction, towards the slot portions $46^x$, $47^x$, and that a neutral zone occurs between each two changes.

In order to effect axial displacement of the shaft 25 by means of the cams 45 passing through the non-circumferential portions $46^y$, $47^y$ of the slots, the shaft 25 is extended in the form of a journal pin 50, which is supported in a bearing held within the cam cup 44. The latter is provided with an internal threaded surface in engagement with a threaded sleeve 52 which has a flange 49 abutting against one end surface of the ball bearing 51 surrounding the journal pin. The other end surface of this ball bearing is engaged by a ring 53 locked against rotation by a set screw or the like to the ring 52, and the ring 52 again is locked against rotation by a screw which enters through the bottom of the cup into the body of the ring 52.

The other end of the shaft 25 is formed by a journal pin 60 rotatable and axially slidable in a bushing 61 which is inserted into a heavy hub 62 of a double-helicoidal or herring-bone gear 63, in the casing chamber 24. The hub 62 of this gear is supported in the chamber 24 by a roller bearing 64, and by additional roller bearings 65 which are also located in the chamber 24 and which support rotatably a journal extension 66 integral with the hub 62 of the herring-bone gear. Owing to these roller bearings which act on two different points on the hub of the gear 63, the latter is safely centrally supported within the casing and is rendered suitable to serve as a bearing for the countershaft 25 at one end of the same. A cap 67 is secured to the chamber 24 by means of the screws 68 and that end of the journal pin extension 66 which projects into the cap carries a worm 69 of common construction for driving a small worm gear 70 of a speedometer transmission. The tapering end 71 of the extension 66 is in fixed connection with a brake disc 72 by means of a hub 73 on the disc, which is keyed to the tapering pin 71.

A flange 74 on the herring-bone gear 63 is concentric to the shaft 25 and is provided on its inner circumference with the gear teeth 75. This internal gear may be caused to engage the teeth of a spur gear 76 which is axially slidable on the splines of the countershaft 25, and which also thereby is fixed to said countershaft so as to rotate with the same. Hence, the herring-bone gear 63 will be driven at the speed at which the shaft 25 is driven when the gear 76 is shifted into engagement with the gear 75.

The pinion 76, which is slidable on the shaft, may assume another operative position and a position intermediate these two operative positions. This pinion may either be brought directly into mesh with the internal gear 75 (as just described) or it may be brought directly into mesh with the spur gear 77 which is the main drive gear of the differential. It is shown in Fig. 4 in the last named position, and the differential, therefore, is driven at a greatly reduced speed from the shaft 25; as this shaft depending upon the selectively determined position of the gears 27 and 28, may be driven at two different speeds, two different speeds may be transmitted to the differential through the spur gear 76, when the latter is in mesh with the gear 77.

In the other operative position of the pinion 76 it is seated in the hub of the herring-bone gear 63, thereby connecting the herring-bone gear directly with the countershaft 25, and this herring-bone gear is in permanent engagement with a similar gear 78 fixedly united with the spur gear 77 of the differential but of a smaller diameter than the spur gear 77. The reduction of speed between the two gears 63 and 78 is, ther fore, not as large as between the two spur gears 76 and 77, but here again the differential may be driven at two selectively determined speeds, depending upon the relative position of bevel gears 27 and 28.

It will also be seen that the chain of power transmission between shaft 10 may be interrupted either by preventing the bevel gears 27, 28 from engaging the gears 19 and 20, or by moving the spur gear 76 to neutral position or at both of these points.

The described gearing, therefore permits of the selection of any one out of four reductions or ratios between the engine shaft and the shaft or shafts to be driven by the differential.

Any desired construction of a differential may be used with the change speed gear described herein. In the device illutsrated in Fig. 4, the driven bevel gears 79 and 80 are directly mounted on the splined ends of shafts 81 and 82, respectively, and are supported in axial alignment within a spider body 83 which receives its drive by being fastened to the gears 77 and 78. This spider body also carries the bevel pinions 84 and 85 which revolve about the common axis of the bevel pinions 79, 80, and at the same time rotate about their own axis. The casing portions 6 and 7 of the differential are equipped with bearings 86 and 87 for the spider body 83, and these bearings also serve through the hub extensions of the spider body 83 and through the hubs of the bevel pinions 79 and 80 for the support of the inner ends of the drive shafts 81 and 82.

The described drive, therefore, permits of the selection of four different rates of speed by means of only three selectively displaceable transmission members, and of these transmission members two belong to one group, namely, bevel gears 27, 28, while the third transmission member independent of the first group is formed by the spur gear 76.

Figure 3:
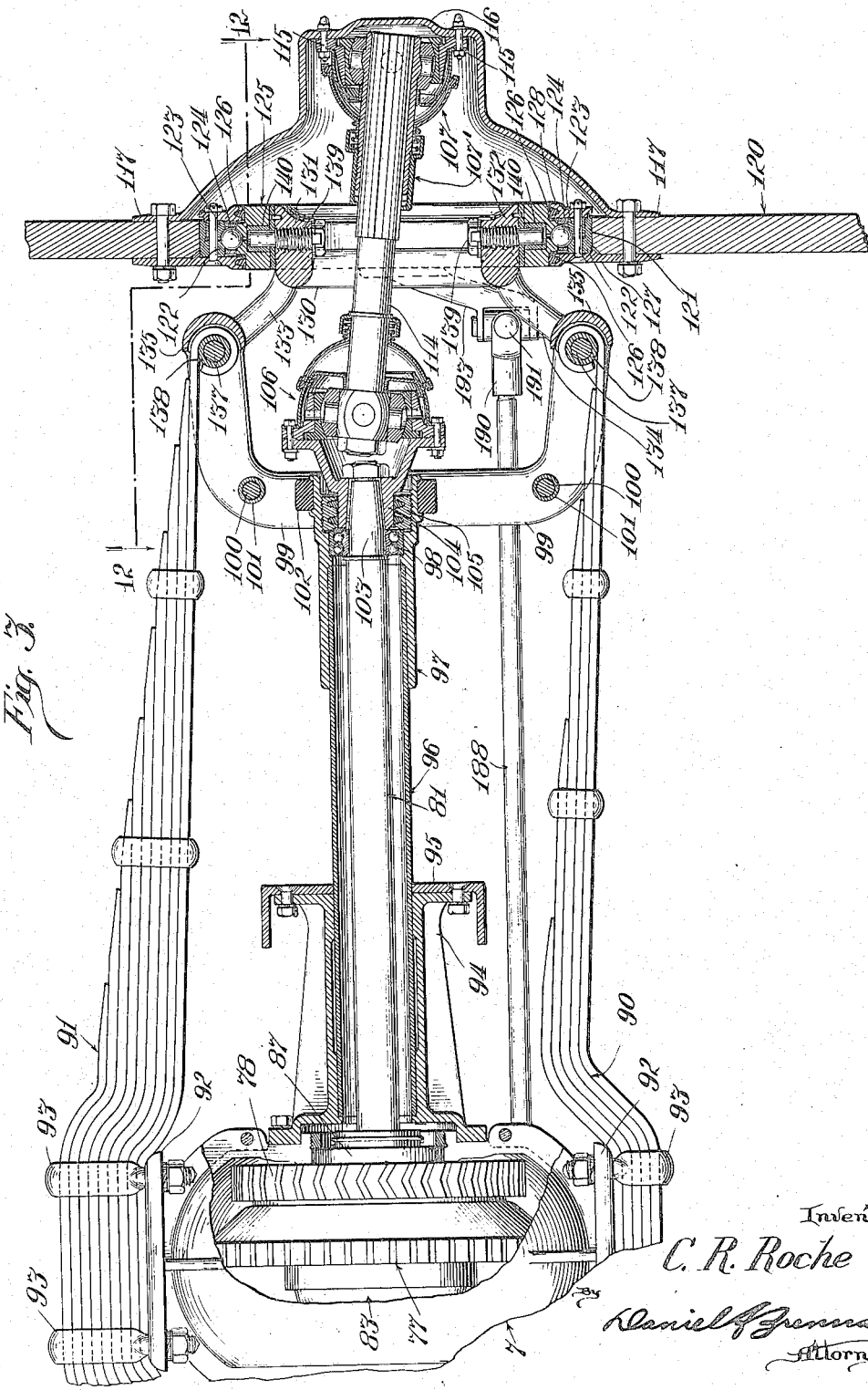
Fig. 3 is a sectional view on line 3—3 of Fig. 2, some of the parts being shown in elevation, and illustrating the connection of the driving axle with the drive wheels.

Figs. 3 and 5 show the mounting of the casing portions 6 and 7 for the differential between sets of transverse springs 90 and 91, which are held in connection with these casing portions by means of brackets 92 secured to the casings and by means of U-shaped holding bolts 93. Axial brackets 94 of suitable construction, are connected with the casings on opposite sides, and are fastened at a distance from them to portions 95 of the chassis.

These brackets serve for receiving tubings 96 in which the driven shafts 81 are rotatably supported. The inner ends of these shafts which are continued to the central portion of the differential, rest in the bearings 86 and 87, while at the opposite ends of these shafts, as illustrated in Figs. 3 and 12 outer fixed sleeves 97 contain bearings 98 for the shafts. These sleeves 97 extend between similar arms 99, to which the ends of the sets of springs 91 and 90 are secured. The arms 99 are helds in spaced relation, Fig. 12, by means of bolts 100 which are surrounded by spacing sleeves 101, and which serve at the same time to limit excessive downward movement of the upper springs 91, and excessive upward movement of the lower springs 90. The free end of the tubular bracket 97 is surrounded by a ring 102 of yielding material adapted to cushion the force with which this shaft may impinge on the sleeves 101, or against the arms 99.

The shaft 81 (and naturally also the shaft 82, the arrangement of the two shafts being the same) terminates in a tapered extension 103 on which the sleeve 104 of a coupling housing is fixed. This housing is held against axial displacement on the shaft by a nut at the free end of the tapered extension 103 and is keyed to the tapered extension so as to rotate with the shaft, the sleeve 104 being surrounded by the packings of a ring 105 which is inserted into the tubular bracket 97 of the shaft. The coupling housing 105 is associated, as shown in Fig. 3, by way of example only, with a universal joint, indicated as a whole at 106, and adapted to establish driving connection between shafts 81 and 106, regardless of their angular position. Any universal joint may be used for transmitting the rotation of the shaft 81 to the shaft 114 and it should be stated here that the universal joint as shown is merely selected by way of example.

The other end of the shaft 114 is provided with a plurality of splines extending axially of the shaft, and in connection with these splines, the shaft carries near its end slidably a similar universal joint connection 107 which is fastened by means of bolts 115 to a shield or dished disc 116, having the general form of a hub cap and having a circumferential flange 117 through which it may be attached to the wheel 120.

From the above, it will be seen that upon rotation of the shaft 81 this rotation is transmitted through the universal joint 106, shaft 114, and through the slip joint 107 to the shield 116, and from this shield to the wheel 120.

From Fig. 3 it will also be noted that the plane of the wheel 120 intersects the universal shaft extension 114 about midway of the length of the latter. The effect of this arrangement is that upon steering the vehicle by turning the plane of the wheel, the extension 114 will assume an angular position to the shaft 81, equal to about one half of the steering angle, while the plane of the wheel will assume an angular position relative to the extension, different from a right angle and complementing the angle between shaft 81 and extension 114 to the desired steering angle. By placing the two joints so that the axis about which the plane of the wheel turns is midway between the joints 106 and 107 the steering angle will be divided, the angle between the joints will be decreased, and hence standard joints may be used.

The wheel is illustrated in Fig. 3 as consisting mainly of a disc with a cylindrical opening 121 to which the outer races 122 and 123 of a ball bearing 124 are secured. The outer race is made up of the parts 122, 123, to facilitate the assembly of the ball bearing within the wheel. The inner race of this ball bearing is formed by a frame 125 and packing strips 126 are inserted between the cover plates 127, 128, and cylindrical shoulders on the inner race 125. The inner ball bearing race or frame 125 is held against rotation by means of a yoke 130 which is illustrated in Figs. 3, 12 and 13, and which is connected with the non-rotatable arms 99 to which the springs 90 and 91 are attached. This yoke 130 as shown in Figs. 3 and 13 comprises an annular portion of approximately square contour, Fig. 13, to fit the opening in frame 125. This yoke 130 has arms 133, 134, the ends of which have transverse semi-tubular sleeves 135, for receiving the end curls of the springs 90, 91. Plates 136 at the ends of the arms serve as bearings for the spring supporting rods 137 and the short pipes 138 surrounding them, Fig. 3. The yoke 130 also carries on opposite sides lugs 131, 132, which have a tapped bore to receive the threaded parts of pivot pins 139 entering the frame 125. These pivot pins, about which the plane of the wheel turns during the steering, as shown in Fig. 3, enter sleeves 140 which are set into the frame 125 so as to take up the wear and tear of the parts.

The means for selectively bringing either of the gears 27, 28 into engagement with the gears 20 and 19, respectively, is partly formed by an arm 142, Fig. 4, which is keyed to the projecting end of a short shaft 143 integral with the cup 44 on which the cams 45 are mounted. As the arm 142 is fixedly connected to this shaft a swinging movement of the arm in a predetermined direction will cause the axial displacement of the countershaft 25 or of the hub sleeve 32 on said shaft, as described above.

The means for shifting the spur gear 76 on the countershaft 25 are shown in Figs. 5, 6 and 7. A cap 145 which closes an opening in the top of the casing portion 5 is provided at its ends with bearings 146 for a rock shaft 147. A bifurcated arm 148 is rigidly mounted on this rock shaft and projects downwardly. The prongs of this arm 148 terminate in enlargements 149 which project between the lugs of a head 150 pinned to a rod 151 which is slidably supported in a bearing 152 of the casing portion 5. The head 150 is part of a shift lever 153 which is bifurcated at its lower end and engages in a known way the circumferential groove 154 on the spur gear 76. If, therefore, a rocking movement is imparted through the crank arm 155, to the shaft 147, the crank 148 will displace the bar or rod 151 in axial direction and in this axial displacement also will effect an axial displacement of the spur gear 76.

Fig. 6 shows the spur gear 76 in a position in which it is not in engagement with the internal gear 75 nor with the spur gear 77. Means are provided for locking the shift member 151 yieldingly in either one of these three positions which the spur gear 76 may occupy. The bearing portion 152 is for this purpose provided with a bore 156 in which a spring 157 is secured. This spring acts upon a ball 158 urging the same into any one of the three notches 159 in the member 151, whereby the accidental displacement of this rod is prevented, requiring the driver to make a substantial effort in rocking the shaft 147 in order to displace the sliding bar 151 and to move the pinion 76 from either operative position to inoperative position, or vice versa.

The mechanism for shifting the gears to reverse drive also is indicated in Figs. 6 and 7 and as shown comprises in the bottom of the casing portion 5 an upstanding lug 160 supporting a rock shaft 161 which also is supported in a lug extending from one side wall of the casing 5 inwardly. In fixed connection with this rock shaft a carrier 162 has sector-shaped arms 163 and near the end of these arms an idler pinion 163 is rotatably mounted. The idler pinion 64 is of substantial axial length so as to be engaged by the spur gear 76 when the shaft 161 is rotated counterclockwise (Fig. 7) and also engage with spur gear 77 whose plane is more to the left (Fig. 6). The swinging movement of the bracket 162 from inoperative position (Fig. 7) to operative position, or vice versa, is limited by a fixed pin 165 which projects into an arcuate slot 166 of one or both sector plates 163. When the shaft 161 and the carrier 162 are rocked, however, in anti-clockwise direction (Fig. 7), the idler pinion 164 will be thrown into mesh with the spur gear 76 and if this spur gear is in neutral position as shown in Fig. 6 the drive of this spur gear 76 will be communicated to the spur gear 77. This intermediary gear 164 will then drive the differential in a direction opposite to the drive of the forward direction.

It should be noted here also that owing to the selective movement of the gears 27, 28 to engagement with either of the gears, 20, 19 the pinion 76 in the position shown in Fig. 6 may be driven at two different rates of speed, and it is, therefore, possible to have two different rates of speed for the reverse drive communicated through the pinion 164 to the gear 77.

Means are provided for preventing the driver from throwing the reverse gear into operation in any position of pinion 76 different from that shown in Fig. 6. This is effected by providing a locking element in connection with the shift member 151, whereby this shift member can be operated only if the reverse drive is not in operation, and whereby, furthermore, the actuation of the reversing pinion 164 can take place only upon locking the shift member in a predetermined position.

To effect the swinging movement of the shaft 161 the projecting end of the same carries a curved crank arm 167, Fig. 5. This arm carries at its upper end a forward and curved extension 168, having a lug 169 in pivotal connection with an actuating bar 170. A locking notch 171 at the end of the extension 168 overlies the shifting member 151 when the latter is in the position indicated in Fig. 6, and in this way the actuation of the bar 170 and crank 167 is prevented, except when in position as shown in Fig. 6. This movement can only take place when the lug 169 and extension 168 are able to travel through the notch 173 in the shift member 151, whereby these two members 151 and 167 may be said to be in mutually lockable relation.

When a swinging movement is imparted to the arm 167 in anti-clockwise direction (Fig. 5), the idler pinion 164 will be swung into mesh with the spur gear 76. This movement of the arm 167, however, is also prevented by a yielding locking means which is illustrated in Fig. 6.

The extension 168 is provided with two spaced sockets 174, 174', adapted to receive a ball 175 which is forced into the sockets by a spring 176 mounted in a bore in the lug 152 of the housing portion 5. The tension of this spring may be regulated by a screw plug 177 which closes the bore. When the ball 175 enters the socket 174 the reverse shift is yieldingly held in inoperative position, while it is yieldingly secured in operative relation through the ball entering the socket 174'.

Means for controlling from the driver's seat the various mechanisms described above are shown more clearly in Figs. 2 and 5 of the drawings. A steering post 180 carries at the upper end the steering wheel 181 of any suitable construction. The steering post upon rotation imparts a swinging movement (through a suitable gear sector or the like which is not shown), to an arm 182 having its lower end movably connected to a drag link 183, the other end of which is in a similar connection with an arm of a bell crank lever 184 oscillatably supported at 185 on the casing portion 5 of the gear shift mechanism. The other arm of the bell crank lever 184 is in similar connection, as, for instance, by a ball and socket joint 187 with a transverse rod 188, Fig. 12, terminating in a bifurcated head 190 between the prongs of which a bolt 191 is supported. This bolt is connected through any suitable knuckle construction 192 with an angular arm 193, a shank of which extends fixedly through the stationary frame 125 associated with the wheel 120.

Another bar may extend from the ball and socket joint 187 to the other wheel, so that both front wheels are in the same way connected to the steering mechanism.

Other rods which extend through or parallel to steering column carry at the lower end the cranks 194 and 195 through which in any suitable way the feed of fuel or the timing of the spark or other conditions may be controlled.

The brakes are controlled primarily by means of a pedal 200 suitably mounted in a bracket 201 on the frame of the vehicle. Upon being depressed or released it rocks two arms 202 and 203 in opposite directions. The end of the arm 202 is in movable connection with a brake rod 204 having its free end adjustably connected to a lever 205 which is rotatably mounted on a pivot pin 206, Fig. 4, supported in a bracket 67 on the casing.

To this lever, Fig. 2, the brake band 207 is fixedly connected with one end, while the other end of the band is attached to a link 209 which is also connected to the lever 205. Upon depression of the pedal 200, therefore, the brake band 207 will be tightened around the brake drum 72, and at the same time the brakes on the rear wheels, as shown in Figs. 15 and 19, will be set owing to the connection of the rods 208 with the arm 203 of the lever. This construction is present at each side of the car.

The bracket 201 also serves for supporting that pedal through the actuation of which the clutch may be moved into and out of operative position. The clutch controlling shaft 210, Fig. 4, is supported in bearings 211, 212 of the housing portion 5, and the clutch actuating means, in general designated at 213, may be of any desired construction. An arm 214, which is fixed to the projecting end of the shaft 210, is connected by the rod 215 with a lever 216 also secured in the bracket 201, whereby, through actuation of the clutch pedal, the clutch may be moved out of operative position or into the same.

In addition to the foot actuated brake pedal 200 an emergency brake control, to be actuated by hand, is provided. A rock-shaft 216, supported in bearings 217 and 218 on the steering post 180, carries at its upper end an operating lever 219. An arm 220, fixed on the rock shaft 216 is in connection through the link 221 with a bell-crank lever 222. An arm of the bell crank lever is connected through the rod 223 with the lever 205 to which the two ends of the brake band 207 are connected. If, therefore, a swinging movement is imparted to the rock shaft 216 by means of the hand lever 219 the brake band 207 also will be tightened.

The change speed mechanism is controlled by a bar 230 which projects through the dashboard and carries the handle or hand wheel 231. The rod 230 is axially movable and is also rotatably supported in a bracket 232 on the rear face of the dashboard. Upon partial rotation of the rod 230 an arm 233 held against rotation on the rod will be rocked to displace axially a link 234 which leads from the arm 233 to an arm 235 on another rock shaft 236. Another arm 237, fixed to the rock shaft 236 is connected through the link 238 with the arm 155 on the shaft 147, Fig. 7. Through suitable rotation of the rock shaft 236, therefore, the spur gear 76 may be shifted from either one of its operative positions to neutral position or vice versa.

The rod 230 may also be displaced longitudinally without affecting the arm 233 and link 234, as the arm 233 is associated with the rod 230 by means of a long key or feather 242. The two independent movements of the rod 230 are therefore transmitted selectively only either to the bar 236 which is also rocked or to the link 253 joined to the bar 230 by a universal joint 252 and which is also displaced longitudinally. The rear end of the link is in movable connection with a lever 254. One arm of the lever 254 is movably joined to a bar 246 which reaches to the crank 142 to swing the same and thereby effect a selective displacement of the bevel gears 27, 28 to operative or inoperative position. The bar 230, therefore, serves through rotation and longitudinal displacement to change the speed of the vehicle and to obtain four different rates of speed, and neutral positions of the gear elements.

Parallel to the rod 230 another rod 250 is disposed which also carries at its front end a hand wheel or handle 251, whereby this bar may be shifted longitudinally. A connecting element 240 similar to the element 252 is joined to a link 241, the rear end of which is movably attached to a lever 243. This lever is connected by the link 170 with the extension 168 through which, by displacement of the extension 168 the lever 167 may be rocked to throw the reverse gear 164 into operative position. While, therefore, one of the control rods, 250, serves for actuating the reverse gear mechanism, the speed change control rod 230 is entirely independent of the same.

The support of the rear wheels is particularly illustrated in Figs. 14 to 18. The side sills 260 of the chassis are provided with brackets 261 which are equipped with tubular bosses 262 and these bosses, as shown in Fig. 14, have in addition to their central openings, lateral vertically enlarged openings 263. A transverse member 264 which may be tubular near the ends, extends from one side sill to the other, and is secured in the brackets 261. It serves for rigidly supporting an angular element 265, one leg of which, projecting into the transverse member 264, is rotatably secured to the same by a head and bushing 266. The bushing may be pressed into the tube 264. The shorter leg of the elbow 265 projects through the lateral opening 263 and terminates in a reduced pin 268 which is similarly secured in a pipe 269, this pipe extending substantially parallel to the side sills. Axial displacement of the angle 265 in the bracket 261 is prevented by an adjustable pressure screw 267 which extends through the bottom plate of the bracket and impinges on a lug 270 of the angle 265. Owing to the firm connection of the pipe 269 with the head 268 any swinging movement of the pipe 269 about the axis of the transverse member 264 is easily made possible.

The opposite end of the pipe 269 is firmly united, as, for instance, by welding or the like, with a reduced pin 275 of a transverse head 276 integral with the short axle or spindle 277 for the rear wheel. The head 276 is elongated beyond the axial line of the spindle 277, Fig. 17. The elongation serves for receiving a bolt 277 through which a U-shaped strap 278 is associated with the head 276. A bracket 280 is secured to the lower part of the strap 278, Figs. 17 and 18, and this bracket serves to hold by means of the U-bolts 281 a set of springs 282 which extend from this supporting point for the rear wheel in opposite directions. The front end of this set of laminated springs is secured to a bracket 290, Figs. 15, 16, on the side sill 260, and a platform 291 constituting a part of this bracket, is provided with walls 292 projecting downwardly and serving for receiving the bolt 293 to which one or more of the springs 282 may be secured in a well known way. The rear end of these springs are secured by shackle straps 295 to the rear end of the chassis, Fig. 1, but any other means for supporting the springs may be selected.

The head 276, of the spindle 277, may also be integral with a circular disc 295 to which another disc 296 is rigidly secured. The disc 296 serves to support the lever through which the brakes on the rear wheel may be controlled.

The rear wheel 300 is supported on the spindle 277, Fig. 18, by means of bearings 301, which are surrounded by a hub 302 fixed through the flange 303 and bolts 304 to the body of the wheel 300. The bolts 304 may serve at the same time for holding a brake drum 305 in central position with respect to the wheel 300. The hub 302 projects through the body of the wheel and serves at the inner end for supporting a retainer 306 which carries a suitable packing so as to prevent the entrance of dust and other impurities into the interior of the hub 302. The outer end of this sleeve is provided with an external thread to receive the closing cap 308. The spindle 277 is provided with another journal pin 310 near its free end and is, thereby, supported in bearings 311 having a flange of the hub 302 as an outer rest. Axial displacement of the two bearings in either direction is prevented by a suitable spacing sleeve 313 which engages the bearing elements at the faces directed towards each other, while the retainer ring 306 at the inner end and a nut 314 at the outer end of the axle prevent the axial displacement of these bearings relatively to the axle 277 in the opposite direction. A dust shield 315 is secured to the outer face of the wheel.

The rod 208 is connected near its rear end to the free end of the arm 320 fixed to the arm 322 which is pivotally secured in a lug 321 projecting from the disc 296, Fig. 19. On the opposite side of the disc the pin 322 is constructed in the form of a cam adapted when rocked to exert a pressure against the end blocks of a brake band 325 normally loose in the interior of the drum, so as to press this brake band into firm frictional engagement with the flange of the brake drum 305. A spring controlled plunger 324 in the interior of the drum holds the band against circumferential movement. Fig. 14 shows that this construction is arranged on each side of the frame, whereby through a depression of the brake pedal 200 the rear wheels may be braked simultaneously—an arrangement which is well known from the ordinary construction of automobiles.

Figs. 20 and 21 illustrate modifications of the drive in showing the adaptation of the same to rear wheels. According to Fig. 20, the drive shaft of the engine is extended beyond the casing 4, 5, the arrangement of which with respect to the motor in this modification is the reverse of that illustrated in Fig. 4. This extension of the shaft indicated at 330 carries the universal joints 331, 332 and the universal joint 332 establishes connection with a shaft 333 taking the place of the shaft extension 10 of Fig. 4.

The casing 5, as shown in this modification, is also provided with the lateral extension chambers 23 and 24, in the interior of which the gear shift mechanism may be located. The differential gearing placed in a casing portion 334, is according to Fig. 20, mounted between the axle housings 335 and transmits the rotary movement directly to the axles which are not shown in this figure. The control of the gearing may be effected in the same way as described with reference to the control of the gearing illustrated in Figs. 2 and 4. The arm 142 serves for permitting the selection of a suitable bevel gear; the arm 167 is connected with the reverse shifting mechanism, and the arm 151 for displacing the spur gear. The axle housings 335 are in this instance connected with the side sills of the chassis by springs in the usual manner and form the transverse member at the rear end of the same.

The modification illustrated in Fig. 21 differs from that illustrated in Fig. 20 by the provision of a suitable beam 336 which also extends from one side sill to the other and connected to them by springs and which is provided with a centrally curved part to provide room for the casing 334 of the differential drive. This casing is rigidly connected by a suitable bracket to the frame of the car. In this instance, the differential transmits its rotary movement through the universal joints 337 and 338 to the axle portions 339 and 340, respectively, the wheels being mounted in a known way on the last named axial portions. In all other respects the drive mechanism may be similar to that disclosed in Figs. 2 and 4.

It is, however, also obvious that the modifications illustrated in Figs. 20 and 21 may be applied independently of the embodiments of the invention illustrated by Figs. 2 and 4. The car which ordinarily receives its drive through imparting forcible rotation to the rear wheels may be converted into a car with a four wheel drive, The four wheels, therefore, may rotate at suitable speeds within certain limits, whereby the entire drive is extremely flexible and the undue strains on the chassis or other portions of the car, while traveling through curves, are entirely avoided.

I claim:

1. In a vehicle a wheel, an annular ball bearing for the same located in the central plane of the wheel, a frame for the vehicle, a companion ball bearing having an inner race, and a yielding supporting structure between the frame of the vehicle and said inner race, the wheel being connected to the supporting structure by pivots located in one plane with the ball bearings.

2. In a vehicle, a wheel, an annular ball bearing for the same having an inner race, a yoke of non-circular outline secured to the inner race, and a yielding support firmly united with the yoke.

3. In a vehicle, a wheel having a ball bearing with a race, a stationary yoke connected with the race and adapted to hold the same against rotation, arms projecting from the yoke, other arms connected with the first named arms and a yielding support attached to said second arms and to a stationary part of the vehicle.

4. In a vehicle, a frame, a wheel, a transverse set of springs attached to an element supported by the frame of the vehicle and secured to a non-rotatable part outside of the wheel and a yoke supported by said last named part and projecting into the wheel.

5. In a vehicle, a frame, a wheel, transverse sets of springs connected with the wheel and the frame, an axle extending between said sets of springs, and stops to limit the movement of the axle relative to said springs and vice versa.

6. In a vehicle, a frame, a wheel, a steering structure for the wheel including a yoke, a pair of transverse sets of springs connected with the yoke of the steering structure and fixedly positioned with respect to the frame, and rigid elements connected to said yoke, said elements being provided with stops to limit relative movement of said springs.

7. In combination with a vehicle wheel, a non-circular flat yoke in the central plane of the wheel, means for turning the wheel relatively to the plane of the yoke, a spring structure and means for connecting the spring structure to the yoke at points equally spaced from the center of the wheel.

8. In an automobile, a frame, a gear casing secured to the frame, an axle driven by the gears in the casing, an axle housing, yielding wheel supports, stops on said wheel supports and a cushion on said axle housing adapted for contact with said stops.

9. In a vehicle, a frame, a wheel, sets of transverse springs rigidly secured to an element fixed to the frame, a quadrilateral yoke attached to the ends of the spring and projecting to the plane of the wheel, and pivot pins secured to opposite sides of said yoke about which the wheel may be turned relatively to the plane of said structure.

10. In a vehicle, a wheel, an axle, and a slip joint extension flexibly joined at one end to the axle and at the other end flexibly secured to the wheel, the plane of the pivot center of the wheel intersecting the axle extension about midway of its length.

11. In an automobile, the combination of a driving axle, an extension, a universal joint connecting the extension with the end of the driving axle, another universal joint at the end of the extension, a shield connected with the second universal joint, and a vehicle wheel secured to said shield, the first named universal joint being located outside the wheel structure, said vehicle wheel having its normal plane of operation midway of the extension.

12. In an automobile, the combination of a driving axle, an extension for the same, a universal joint connecting the extension with the driving axle, a vehicle wheel, a sleeve slidable on the extension and held against rotation relatively to said extension, a universal joint secured to said sleeve, a shield connected with the universal joint, and a wheel attached to said shield.

13. In an automobile, the combination of a driving axle, an extension for the same, a universal joint connecting the end of the extension with the end of the driving axle, another universal joint associated with the other end of said extension, a vehicle wheel having its normal plane of operation midway between the two ends of the extension, and a rigid connection between said second universal joint and said wheel.

14. In an automobile, the combination of a driving axle, an extension for the same, a universal joint connecting one end of the extension with the end of the driving axle, a universal joint at the other end of the extension, said universal joint being disposed slidably in axial direction on said extension, a vehicle wheel, and a rigid connection between the outer surface of the vehicle wheel and said second universal joint.

15. In combination with a frame for a vehicle, a vehicle wheel, a driving axle, an extension flexibly united with the axle and with the wheel, means interposed between the frame and the wheel for automatically varying the relation of the wheel to said axle upon occurrence of road shocks, and manually operable means for turning the wheel about a pivot center between the ends of the extension.

16. In combination with a frame for a vehicle, a vehicle wheel, a driving axle, an extension flexibly united with the axle and with the wheel, means interposed between the frame and the wheel for automatically varying the relation of said wheel to said axle upon occurrence of road shocks, and manually operable means for turning the wheel about a pivot center midway of the extension.

17. In combination with a frame for a vehicle, a vehicle wheel, a driving axle, an extension flexibly united with the axle and with the wheel, transverse springs interposed between the frame and the wheel and adapted to effect displacement of the wheel relatively to the driving axle upon occurrence of road shocks without interrupting the flow of power from the driving axle to the wheel, and means for turning the wheel about a pivot center between the ends of the extension.

18. In combination with a frame for a vehicle, a vehicle wheel, a driving axle, an extension flexibly united with the axle and the wheel, a yoke supported centrally of the wheel, springs interposed between the yoke and the frame of the vehicle and adapted to absorb road shocks on the wheel, and manually operable means for turning the wheel on the yoke about a pivot center midway of the extension.

19. In combination with a frame for a vehicle, a vehicle wheel, a driving axle, a slip joint extension flexibly united with the axle and with the wheel, a yoke centrally supported of the wheel, springs interposed between the frame of the vehicle and the yoke and adapted to absorb road shocks and to permit variation of the relation between the wheel and the driving axle without interrupting the flow of power, and means for turning the wheel about a pivot center midway of the extension, said turning means being associated with said yoke.

In testimony whereof, I affix my signature in the presence of two witnesses at 36 W. Randolph St., Chicago, Illinois.

CLIFTON R. ROCHE.

Witnesses:
FRANCES HERMAN,
DANIEL A. BRENNAN.